US012687940B2

(12) United States Patent
Chang et al.

(10) Patent No.: US 12,687,940 B2
(45) Date of Patent: Jul. 21, 2026

(54) PROJECTION DEVICE

(71) Applicant: Coretronic Corporation, Hsin-Chu (TW)

(72) Inventors: Chih-Hui Chang, Hsin-Chu (TW); Jeng-An Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 350 days.

(21) Appl. No.: 18/336,970

(22) Filed: Jun. 17, 2023

(65) Prior Publication Data

US 2023/0409133 A1      Dec. 21, 2023

(30) Foreign Application Priority Data

Jun. 20, 2022    (CN) .......................... 202221536722.5

(51) Int. Cl.
*G06F 3/038* (2013.01)
*H04N 5/74* (2006.01)

(52) U.S. Cl.
CPC .............. *G06F 3/038* (2013.01); *H04N 5/74* (2013.01); *G06F 2203/0384* (2013.01)

(58) Field of Classification Search
CPC ... G06F 3/038; G06F 2203/0384; H04N 5/74; H04N 9/3141; H01H 3/12; G03B 21/145; G03B 21/14
See application file for complete search history.

(56) References Cited

U.S. PATENT DOCUMENTS

| 12,204,289 B1 * | 1/2025 | Allec ........................ A44C 5/22 |
| 2002/0126340 A1 * | 9/2002 | Nikiforov .............. H04B 10/11 |
| | | 398/118 |
| 2008/0055563 A1 * | 3/2008 | Momose ................ G03B 21/16 |
| | | 353/61 |

(Continued)

FOREIGN PATENT DOCUMENTS

| TW | 200637187 | 10/2006 | |
| TW | 202209871 | 3/2022 | |
| WO | WO-2023200067 A1 * | 10/2023 | ............... H01Q 1/24 |

OTHER PUBLICATIONS

English Translation of KR 10-2022-0056658 for WO2023200067 (Year: 2022).*

*Primary Examiner* — Kyu Chae
(74) *Attorney, Agent, or Firm* — JCIPRNET

(57) ABSTRACT
A projection device including a casing, an operation module, a main board, and a conducting element is provided. The operation module includes an operation element and an operation circuit board. The operation element is disposed on the casing to execute a first operation. The operation circuit board is coupled to the operation element. The operation circuit board includes a wireless signal emitter and a first conducting portion. The operation circuit board generates a first operation signal in response to the first operation, and the wireless signal emitter emits the first operation signal. The main board includes a wireless signal receiver and a second conducting portion. The wireless signal receiver is configured to receive the first operation signal, and the main board is configured to execute a first action corresponding to the first operation signal. The conducting element is electrically connected to the first conducting portion and the second conducting portion.

16 Claims, 5 Drawing Sheets

1

(56)           References Cited

U.S. PATENT DOCUMENTS

| 2008/0204269 | A1* | 8/2008 | Wu | G08C 23/04 |
| | | | | 340/4.3 |
| 2019/0269009 | A1* | 8/2019 | Park | H05K 1/036 |
| 2019/0280366 | A1* | 9/2019 | Kato | H01L 23/4985 |
| 2022/0131291 | A1* | 4/2022 | Chen | H01R 12/58 |
| 2023/0336202 | A1* | 10/2023 | Kim | H01Q 21/28 |

* cited by examiner

PROJECTION DEVICE

CROSS-REFERENCE TO RELATED APPLICATION

This application claims the priority benefit of China application serial no. 202221536722.5, filed on Jun. 20, 2022. The entirety of the above-mentioned patent application is hereby incorporated by reference herein and made a part of this specification.

BACKGROUND

Technical Field

The disclosure relates to an optical apparatus, and more particularly, to a projection device.

Description of Related Art

An operation panel of a projector product (a projection device) on the market usually includes operation elements such as switch buttons, menu control buttons, and LED indicators. The operation elements are configured to be operated by a user. A keypad board coupled to the operation elements generates an operation signal due to operation of the user. Inside the projection device, a main board corresponding to an optical engine is further disposed.

A configuration position of the keypad board is more easily affected by an appearance design of the projection device, while a configuration position of the main board is more easily affected by a configuration of internal parts of the projection device. Generally speaking, the main board and the keypad board in a discrete configuration are mainly connected by a cable, which is configured to transmit the operation signal from the keypad board to the main board, so that the main board may perform an action corresponding to the operation signal. Therefore, spatial coupling is required between the keypad board and the main board.

If a length of the cable is just enough to connect the main board and the keypad board, the cable is required to be unplugged before assembling or repairing the projection device. When the cable is disassembled and reassembled for many times, it is easy to be loosened, so that the projection device loses the operation function. If the length of the cable is left to the margin, it will occupy the internal space of the projection device. In addition, it is difficult to automate the plugging and unplugging of the cable and requires manpower, which significantly increases manufacturing cost of the projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

According to an embodiment of the disclosure, a projection device is provided, which does not require a cable to execute power transmission and signal transmission between a main board and an operation circuit board, and thus has good performance.

Other objectives and advantages of the disclosure may be further understood from the technical features disclosed herein.

In order to achieve one, a part, or all of the above objectives or other objectives, according to an embodiment of the disclosure, a projection device is provided. The projection device includes a casing, an operation module, a main board, and a conducting element. The operation module includes an operation element and an operation circuit board. The operation element is disposed on the casing to execute a first operation. The operation circuit board is disposed in the casing and coupled to the operation element. The operation circuit board includes a wireless signal emitter and a first conducting portion. The operation circuit board generates a first operation signal in response to the first operation, and the wireless signal emitter is configured to emit the first operation signal. The main board is disposed in the casing. The main board includes a wireless signal receiver and a second conducting portion. The wireless signal receiver is configured to receive the first operation signal, and the main board is configured to execute a first action corresponding to the first operation signal. The conducting element is electrically connected to the first conducting portion and the second conducting portion.

In an embodiment, the casing includes a light-transmitting region. The light-transmitting region is correspondingly disposed on a receiving axis of the wireless signal receiver to receive a second operation signal from outside the casing, so that the second operation signal penetrates the light-transmitting region and then enters the casing, and is received by the wireless signal receiver of the main board. The main board is configured to execute a second action corresponding to the second operation signal.

In an embodiment, the projection device further includes a lens disposed on the casing, and at least a part of the lens is disposed on the light-transmitting region.

In an embodiment, the projection device further includes at least one signal reflection surface to reflect the first operation signal emitted by the wireless signal emitter to be received by the wireless signal receiver. The at least one signal reflection surface includes at least one of an inner surface of the casing, an upper surface of the main board, a lower surface of the main board, an upper surface of the operation circuit board, a lower surface of the operation circuit board, and an inner surface of the lens.

In an embodiment, the projection device further includes a remote control device to emit the second operation signal.

In an embodiment, the projection device further includes at least one signal reflection surface to reflect the first operation signal emitted by the wireless signal emitter, so that the first operation signal is received by the wireless signal receiver, and the at least one signal reflection surface includes at least one of an inner surface of the casing, an upper surface of the main board, a lower surface of the main board, an upper surface of the operation circuit board, and a lower surface of the operation circuit board.

In an embodiment, the conducting element is an elastic metal element.

In an embodiment, the operation circuit board includes an upper surface and a lower surface, and the wireless signal emitter of the operation circuit board is disposed on one of the upper surface or the lower surface.

In an embodiment, the operation circuit board includes a lateral surface, and the wireless signal emitter of the operation circuit board is disposed on the lateral surface.

In an embodiment, the wireless signal receiver of the main board is disposed on an extension plane of the operation circuit board.

In an embodiment, the first operation signal is one of an infrared (IR) signal, a visible light signal, or a Bluetooth signal.

In an embodiment, the wireless signal emitter includes an emission axis. The wireless signal receiver includes a receiving axis. The emission axis is not parallel to the receiving axis.

In an embodiment, the wireless signal emitter includes an emission axis. The wireless signal receiver includes a receiving axis. The emission axis is perpendicular to the receiving axis.

In an embodiment, a configuration surface of the wireless signal emitter is disposed opposite to a configuration surface of the wireless signal receiver.

In an embodiment, the wireless signal receiver includes a receiving axis, and the receiving axis is perpendicular to a planar extending direction of the main board.

In an embodiment, the second conducting portion of the main board is configured to supply power to the first conducting portion of the operation circuit board.

Based on the above, the projection device provided in the embodiment of the disclosure transmits the operation signal to the main board by the wireless signal emitter, and transmits the power from the main board to the operation circuit board by the conducting element. The visible cable is not required to be disposed between the main board and the operation circuit board, which may avoid the inconvenience caused by the cable during assembly and maintenance of the projection device.

In order for the aforementioned features and advantages of the disclosure to be more comprehensible, embodiments accompanied with drawings are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The above and other technical contents, features and effects of the disclosure will be apparent from the following detailed description of a preferred embodiment with reference to the accompanying drawings. Directional terms mentioned in the text, such as "upper," "lower," "front," "back," "left," "right," etc., merely refer to directions with reference to the accompanying drawings. Therefore, the directional terms used are used to illustrate, but not to limit the disclosure. In addition, the term "coupling" mentioned in the following embodiments may refer to any direct or indirect connection means. Furthermore, the term "signal" may refer to at least one current, voltage, charge, temperature, data, electromagnetic wave, or any other signal or signals.

Figure 1A:
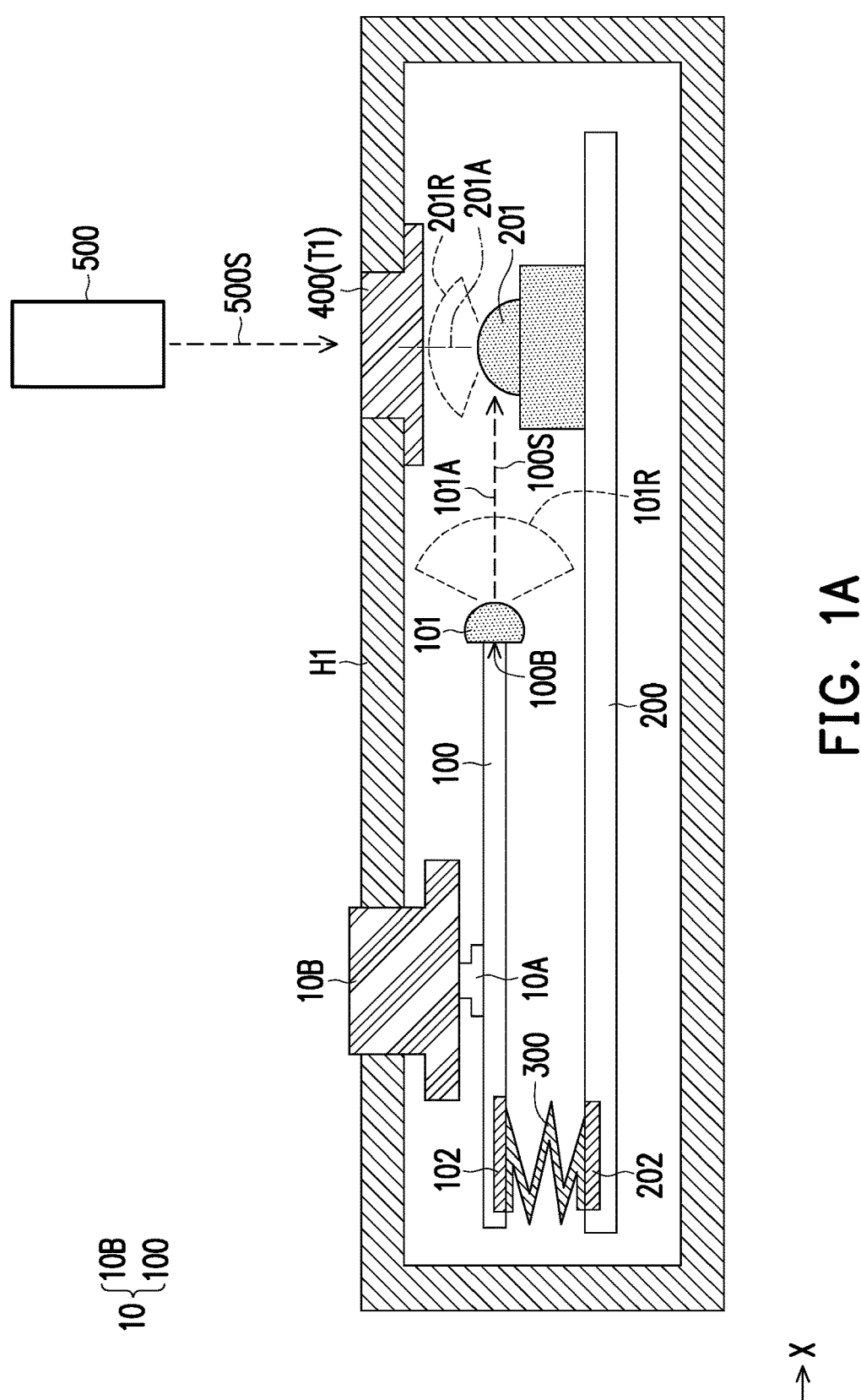
FIG. 1A is a schematic view of a projection device according to an embodiment of the disclosure.
Figure 1B:
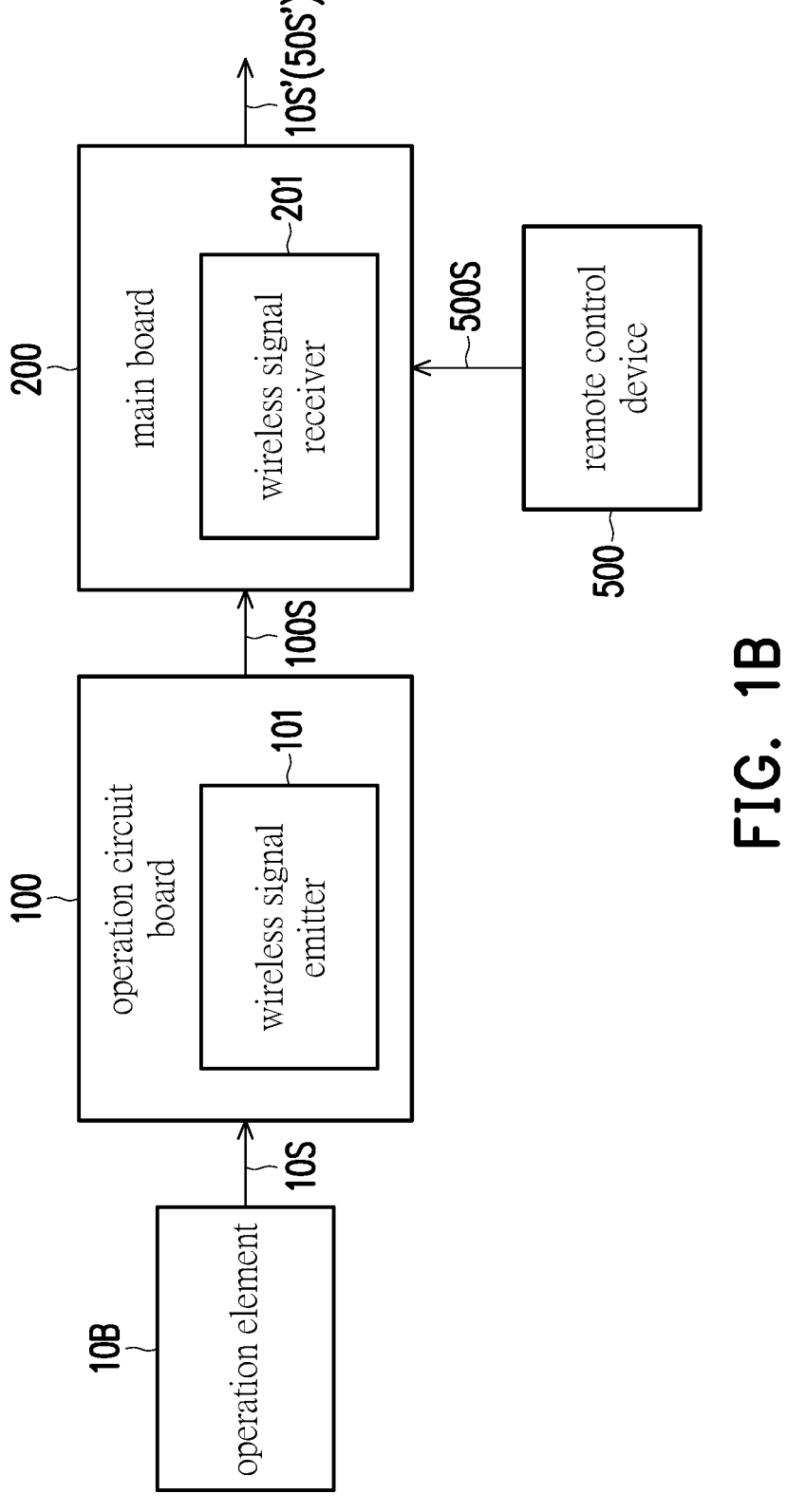
FIG. 1B is a schematic view of signal transmission of the projection device shown in FIG. 1A.

Referring to both FIGS. 1A and 1B, FIG. 1A is a schematic view of a projection device according to an embodiment of the disclosure. FIG. 1B is a schematic view of signal transmission of the projection device shown in FIG. 1A. A projection device 1 includes a casing H1, an operation module 10, a main board 200, and a conducting element 300. The operation module 10 includes an operation element 10B and an operation circuit board 100. The operation element 10B includes, for example, a switch button, a menu control button, a brightness adjustment button, etc. In addition to the above buttons, a form of the operation element 10B may also be a push button, a swing lever, a rotary knob, etc. The operation element 10B is disposed on the casing H1. More specifically, the operation element 10B may be disposed on a lateral surface or a top surface outside the casing H1, for example. The operation element 10B is configured to execute a first operation 10S. An objective of executing the first operation 10S is, for example, to turn on the projection device 1, turn off the projection device 1, perform a keystone adjustment of a projection image, adjust brightness of the projection image, set an input source of the projection device 1, etc., and the disclosure is not limited thereto.

The operation circuit board 100 is disposed in the casing H1. The operation circuit board 100 includes a wireless signal emitter 101 and a first conducting portion 102. The operation circuit board 100 generates a first operation signal 100S in response to the first operation 10S, and the wireless signal emitter 101 of the operation circuit board 100 is configured to emit the first operation signal 100S. More specifically, the operation circuit board 100 further includes an operation circuit, and the operation circuit includes a switch element 10A and a first micro control unit (not shown in the figure). The operation circuit is coupled to the wireless signal emitter 101. When the user executes the first operation 10S, the operation element 10B is coupled to a switch element 10A on the operation circuit board 100 due to being pressed (as a state shown in FIG. 1A), and triggers the switch element to generate an electrical signal. The electrical signal is transmitted to the first micro control unit on the operation circuit board, and the first micro control unit is configured to receive the electrical signal, encode the electrical signal, and send the electrical signal to the wireless signal emitter 101. The wireless signal emitter 101 is configured to emit the first operation signal 100S corresponding to the electrical signal.

The main board 200 is disposed in the casing H1. The main board 200 includes a wireless signal receiver 201 and a second conducting portion 202. The second conducting portion 202 is configured to supply power to the first conducting portion 102 of the operation circuit board 100 through the conducting element 300. The first conducting portion 102 and the second conducting portion 202 may be copper regions exposed on surfaces of the operation circuit board 100 and the main board 200, respectively. The main board 200 further includes a main circuit (not shown in the figure), and the main circuit includes a second micro control unit and a control unit (not shown in the figure). The wireless signal receiver 201 of the main board 200 is configured to receive the first operation signal 100S from the wireless signal emitter 101, and the second micro control unit on the main board 200 is configured to decode the first operation signal 100S to generate a first action signal (not shown) and transmit the first action signal to the control unit, and is configured to execute a first action 10S' corresponding to the first operation signal 100S. Specifically, the first action 10S' is, for example, to turn on the projection device 1, turn off the projection device 1, perform the keystone adjustment of the projection image, adjust the brightness of the projection image, set the input source of the projection device 1, etc., and the disclosure is not limited thereto.

The wireless signal emitter 101 includes an emission axis 101A, and the emission axis 101A may be regarded as a symmetry axis of an emission range of the wireless signal emitter 101. The wireless signal receiver 201 includes a receiving axis 201A, and the receiving axis 201A may be regarded as a symmetry axis of a receiving range of the wireless signal receiver 201. In FIG. 1A, an emission angle of the wireless signal emitter 101 is indicated by a central angle of a sector 101R, and a receiving angle of the wireless signal receiver 201 is indicated by a central angle of a sector 201R. The emission range of the wireless signal emitter 101 is, for example, an extending range of the sector 101R in a radial direction thereof, and the receiving range of the wireless signal receiver 201 is, for example, an extending range of the sector 201R in a radial direction thereof. The receiving range of the wireless signal receiver 201 at least partially overlaps the emission range of the wireless signal emitter 101, so that the wireless signal receiver 201 may receive the signal from the wireless signal emitter 101. In an embodiment, the emission range of the wireless signal emitter 101 covers the receiving range of the wireless signal receiver 201. In an embodiment, the receiving range of the wireless signal receiver 201 covers the emission range of the wireless signal emitter 101.

In a preferred embodiment, the wireless signal receiver 201 is disposed within the emission range of the wireless signal emitter 101, as shown in FIG. 1A. The wireless signal emitter 101 in FIG. 1A is disposed on a lateral surface 100B of the operation circuit board 100. An emission direction of the wireless signal emitter 101 is toward the wireless signal receiver 201. The wireless signal emitter 101 and the wireless signal receiver 201 are both disposed on an extension plane of the operation circuit board 100 along an X direction. In addition, the emission axis 101A of the wireless signal emitter 101 is parallel to the extension plane of the operation circuit board 100, and the emission axis 101A is perpendicular to the receiving axis 201A of the wireless signal receiver 201.

As mentioned above, the receiving range of the wireless signal receiver 201 at least partially overlaps the emission range of the wireless signal emitter 101, and the wireless signal receiver 201 may receive the signal from the wireless signal emitter 101. Therefore, in some embodiments, the wireless signal receiver 201 may also not be disposed on the extension plane of the operation circuit board 100. In some embodiments, the emission axis 101A of the wireless signal emitter 101 is not perpendicular to the receiving axis 201A of the wireless signal receiver 201.

A configuration relationship between the wireless signal emitter 101 and the wireless signal receiver 201 has the above degree of freedom, and the main board 200 may transmit the power to the operation circuit board 100 through the conducting element 300 electrically connected to the first conducting portion 102 and the second conducting portion 202. That is to say, there may be no wires such as a cable between the main board 200 and the operation circuit board 100, which avoids inconvenience caused by disassembly and maintenance of the cable, and avoids an issue of loss of operating performance of the projection device due to the falling off of the cable. Therefore, the projection device 1 in this embodiment may have good performance.

Referring to FIG. 1A again, the wireless signal receiver 201 is disposed on the surface of the main board 200 perpendicular to a Y direction. The receiving axis 201A of the wireless signal receiver 201 is perpendicular to a planar extending direction of the main board 200. The projection device 1 may further include a remote control device 500. The remote control device 500 may include a remote wireless signal emitter. The remote control device 500 is configured to emit a second operation signal 500S. The casing H1 includes a light-transmitting region T1. The light-transmitting region T1 is correspondingly disposed on the receiving axis 201A of the wireless signal receiver 201, or at least correspondingly disposed within the extending range of the sector 201R, so that the second operation signal 500S from outside the casing H1 may penetrate the light-transmitting region T1 and then enter the casing H1, and be received by the wireless signal receiver 201 of the main board 200. The main board 200 executes a second action 50S' corresponding to the second operation signal 500S. The second action 50S' is, for example, to turn on the projection device 1, turn off the projection device 1, perform the keystone adjustment of the projection image, adjust the brightness of the projection image, set the input source of the projection device 1, etc., and the disclosure is not limited thereto.

The projection device 1 may further include a lens 400 disposed on the casing H1, and at least a part of the lens 400 is disposed on the light-transmitting region T1. The second operation signal 500S from outside the casing H1 penetrates the lens 400 and is received by the wireless signal receiver 201.

In this embodiment, the wireless signal receiver 201 is configured to receive the first operation signal 100S from the wireless signal emitter 101 and the second operation signal 500S from the remote control device 500, and the second operation signal 500S from outside the casing H1 enters the casing H1 along the Y direction. Therefore, in FIG. 1A, the wireless signal emitter 101 and the wireless signal receiver 201 are preferably disposed such that the wireless signal emitter 101 emits the signal along the X direction, and the wireless signal receiver 201 receives the signal along the Y direction.

In this embodiment, both the operation circuit board 100 and the main board 200 are disposed perpendicularly to the Y direction, and the conducting element 300 connected to the operation circuit board 100 and the main board 200 is an elastic metal element. As shown in FIG. 1A, the conducting element 300 may be, for example, a spring. Due to elasticity of the elastic metal element, when a distance between the operation circuit board 100 and the main board 200 is slightly compressed, the conducting element 300 may be slightly pressed to apply force to two ends thereof, ensuring that the two ends of the conducting element 300 are in close contact with both the first conducting portion 102 and the second conducting portion 202, which may avoid unexpected power failure. For example, when the projection device 1 is moved, the distance between the operation circuit board 100 and the main board 200 may be changed, and poor conduction may occur. In addition, the conducting element 300 is used as a connecting element for electrically connecting the operation circuit board 100 and the main board 200, which is easy to install in the process, and does not require manual plugging and unplugging of the cable, which is beneficial to automatic production of the projection device 1 and significantly reduces production cost of the projection device. In addition, since the elastic metal element is a solid metal, the elastic metal element has greater stiffness than the cable. Therefore, the elastic metal element is less likely to be loosened or entangled like the cable, and the elastic metal element is relatively small in size and does not occupy a lot of space inside the projection device 1 like the cable. Therefore, the projection device 1 in this embodiment has good stability and competitiveness.

To fully illustrate the various embodiments of the disclosure, other embodiments are provided below for explanation. It should be noted here that the following embodiments adopt the reference numbers and partial contents of the foregoing embodiments, wherein the same reference numbers are used to indicate the same or similar elements, and the description of the same technical content is omitted. For the description of the omitted parts, reference may be made to the foregoing embodiments, and the same content will not be iterated in the following embodiments.

Figure 2:
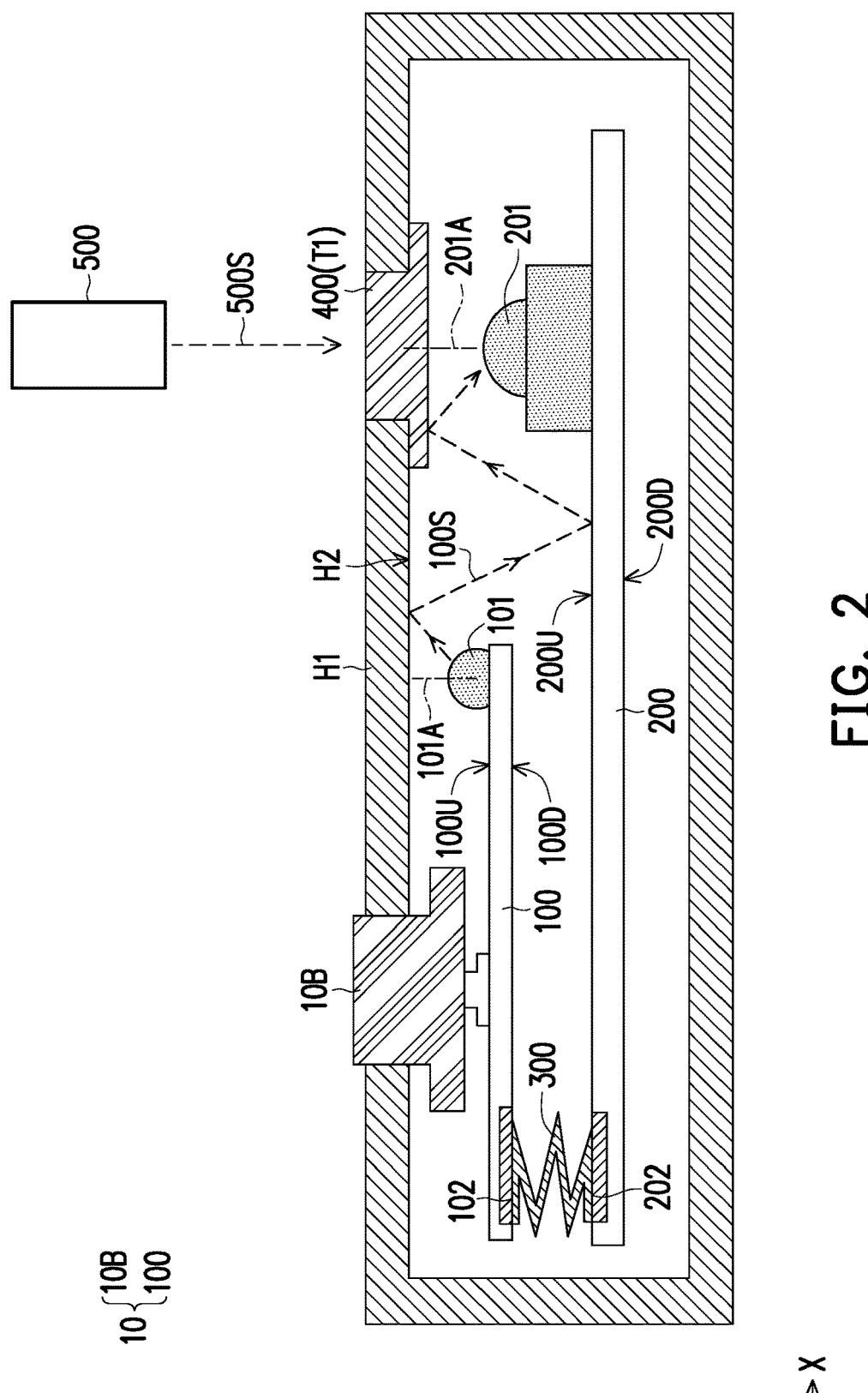
FIGS. 2 to 3 are schematic views of projection devices according to some embodiments of the disclosure.

Referring to FIG. 2, FIG. 2 is a schematic view of a projection device according to another embodiment of the disclosure. A difference between a projection device 2 in FIG. 2 and the projection device 1 in FIG. 1A is that the wireless signal emitter 101 is disposed on an upper surface 100U of the operation circuit board 100 perpendicular to the Y direction, and the emission direction of the wireless signal emitter 101 is the same as a receiving direction of the wireless signal receiver 201. The upper surface 100U may be a surface configured with other electronic elements and operation circuits. The first operation signal 100S is sequentially reflected by an inner surface H2 of the casing H1, an upper surface 200U of the main board 200, and an inner surface (not shown in the figure) of the lens 400, and then received by the wireless signal receiver 201. In another embodiment, the first operation signal 100S is received by the wireless signal receiver 201 after being reflected only once by the inner surface H2 of the casing H1. Specifically, since the operation circuit board 100 is disposed above the upper surface 200U of the main board 200, the inner surface H2 of the casing H1, the upper surface 200U of the main board 200, and the inner surface of the lens 400 are used as signal reflection surfaces to reflect the first operation signal 100S.

In other embodiments, a configuration relationship between the operation circuit board 100 and the main board 200 may be different from an upper and lower configuration shown in FIG. 2. In addition, except for the inner surface H2 of the casing H1, the upper surface 200U of the main board 200, and the inner surface of the lens 400, a lower surface 200D of the main board 200, the upper surface 100U of the operation circuit board 100, and a lower surface 100D of the operation circuit board 100 may also be used as the signal reflection surfaces to reflect the first operation signal 100S. The directional terminology, such as up and down, for the upper surface 200U of the main board 200, the lower surface 200D of the main board 200, the upper surface 100U of the operation circuit board 100, and the lower surface 100D of the operation circuit board 100 described herein are defined by a drawing direction in FIG. 2.

In an embodiment, the operation circuit board 100 and the main board 200 are disposed up and down as shown in FIG. 2. The wireless signal emitter 101 is disposed on the lower surface 100D of the operation circuit board 100, and the wireless signal receiver 201 is disposed on the upper surface 200U of the main board 200. That is, the emission direction of the wireless signal emitter 101 is opposite to the receiving direction of the wireless signal receiver 201. The lower surface 100D may be a surface configured with other electronic elements and operation circuits. The first operation signal 100S is sequentially reflected by the upper surface 200U of the main board 200 and the inner surface H2 of the casing H1 or the inner surface of the lens 400, and then received by the wireless signal receiver 201. In another embodiment, the first operation signal 100S is sequentially reflected by the upper surface 200U of the main board 200, the lower surface 100D of the operation circuit board 100, the upper surface 200U of the main board 200, and the inner surface H2 of the casing H1 or the inner surface of the lens 400, and then received by the wireless signal receiver 201.

In an embodiment, the main board 200 is disposed at a bottom of the casing H1, and the operation circuit board 100 is disposed on the lateral surface of the casing H1. The extension planes of the main board 200 and the operation circuit board 100 are disposed perpendicularly to each other (refer to the configuration in FIG. 4). In addition, the wireless signal emitter 101 is disposed on a surface of the operation circuit board 100 facing an inside of the casing H1, and the wireless signal receiver 201 is disposed on the upper surface 200U of the main board 200. The first operation signal 100S is sequentially reflected by the upper surface 200U of the main board 200, the inner surface H2 of the casing H1, the upper surface 200U of the main board 200, and the inner surface of the lens 400, and then received by the wireless signal receiver 201. A bottom and a lateral surface of the projection device 2 described herein are also defined by the drawing direction in FIG. 2.

Referring back to FIG. 2, in this embodiment, the emission axis 101A of the wireless signal emitter 101 is parallel to the receiving axis 201A of the wireless signal receiver 201. However, in some embodiments, the emission axis 101A of the wireless signal emitter 101 may not be parallel to the receiving axis 201A of the wireless signal receiver 201, and the first operation signal 100S emitted by the wireless signal emitter 101 is received by the wireless signal receiver 201 after being reflected by at least a part of each of the signal reflection surfaces.

Figure 3:
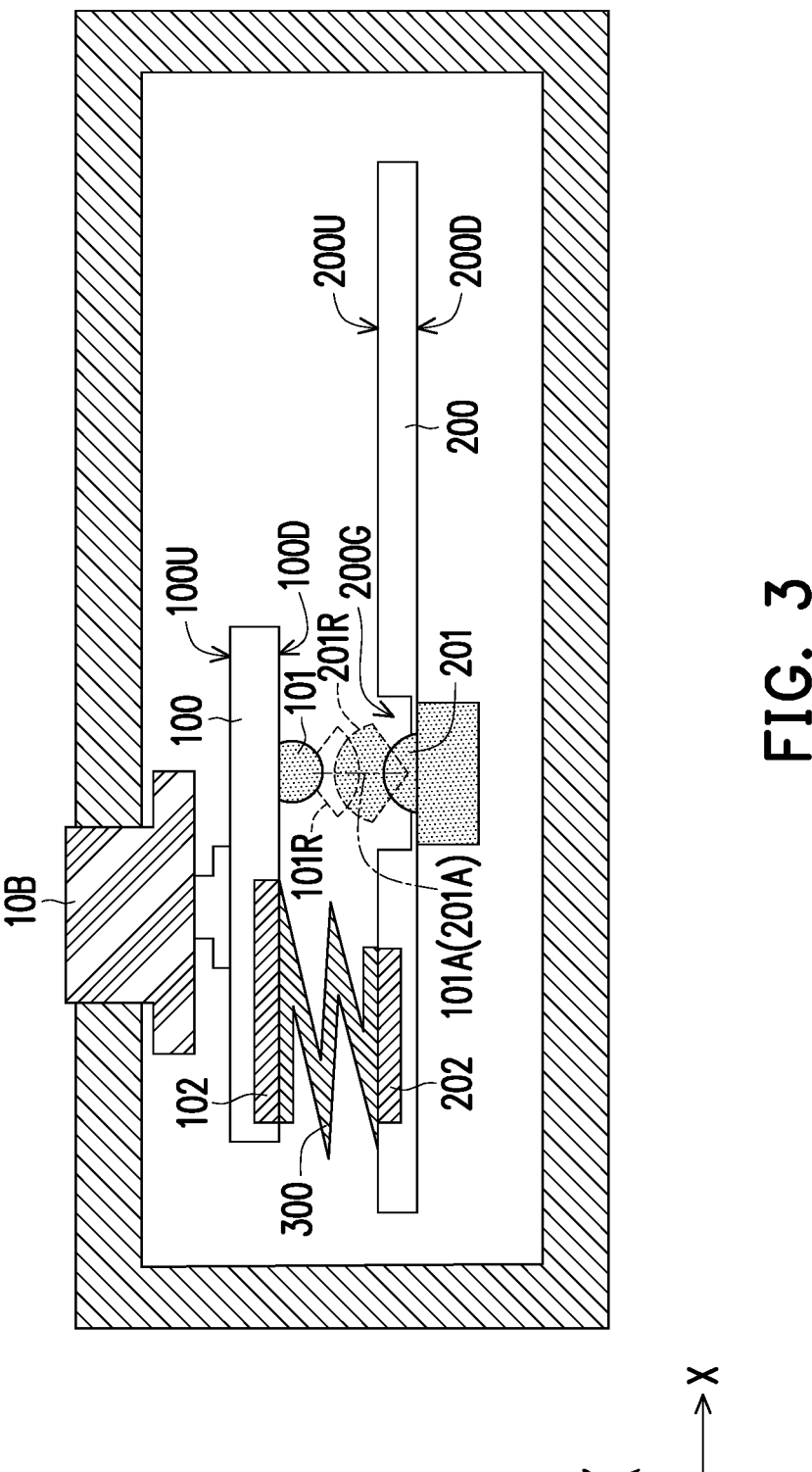

Referring to FIG. 3, FIG. 3 is a schematic view of a projection device according to another embodiment of the disclosure. A difference between a projection device 3 in FIG. 3 and the projection device 1 in FIG. 1A is that the wireless signal emitter 101 is disposed on the lower surface 100D of the operation circuit board 100, and the emission direction is toward the main board 200. The main board 200 has a groove 200G. The wireless signal receiver 201 is disposed in the groove 200G of the main board 200, and the receiving direction is toward the operation circuit board 100. In an embodiment, the wireless signal emitter 101 is disposed on the lower surface 100D of the operation circuit board 100, and the wireless signal receiver 201 is disposed on the upper surface 200U of the main board 200. The lower surface 100D is disposed opposite to the upper surface 200U. In the embodiment shown in FIG. 3, the emission axis 101A of the wireless signal emitter 101 is parallel to and overlaps the receiving axis 201A of the wireless signal receiver 201, and signal intensity is high.

In the above embodiment, the first operation signal 100S emitted by the wireless signal emitter 101 may be one of an infrared (IR) signal, a visible light signal, or a Bluetooth signal. In some embodiments, the first operation signal 100S may carry the Morse code in a flashing manner to facilitate identification.

Figure 4:
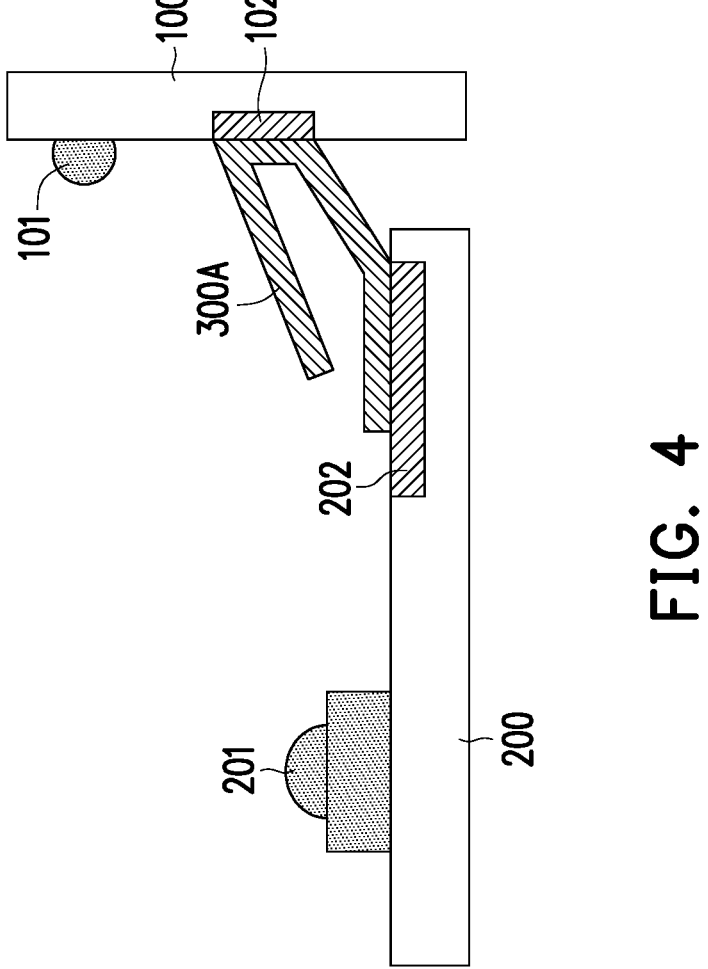
FIG. 4 is a schematic partial structural view of a projection device according to an embodiment of the disclosure.

Referring to FIG. 4, FIG. 4 is a schematic partial structural view of a projection device according to an embodiment of the disclosure. In this embodiment, the extension planes of the operation circuit board 100 and the main board 200 are disposed perpendicularly to each other. The emission range of the wireless signal emitter 101 at least partially overlaps the receiving range of the wireless signal receiver 201. The second conducting portion 202 of the main board 200 supplies the power to the first conducting portion 102 of the operation circuit board 100 through a conducting element 300A. The conducting element 300A in this embodiment is, for example, an elastic sheet having elasticity.

Based on the above, the projection device provided in the embodiment of the disclosure transmits the operation signal from the operation circuit board to the main board by the wireless signal emitter, and transmits the power from the main board to the operation circuit board by the conducting element. The visible cable is not required to be disposed between the main board and the operation circuit board, which avoids the inconvenience caused by the cable during assembly and maintenance of the projection device.

However, the above are only preferred embodiments of the disclosure and are not intended to limit the scope of the disclosure. That is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents, and are not intended to limit the scope of the disclosure. In addition, the terms "first," "second," and the like mentioned in the specification or the claims are used only to name the elements or to distinguish different embodiments or scopes, and are not intended to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising a casing, an operation module, a main board, and a conducting element, wherein the operation module comprises an operation element and an operation circuit board;

the operation element is disposed on the casing to execute a first operation; and the operation circuit board is disposed inside the casing and coupled to the operation element, and the operation circuit board comprises a wireless signal emitter and a first conducting portion, wherein an operation circuit on the operation circuit board is configured to generate a first operation signal in response to the first operation, and the wireless signal emitter is configured to emit the first operation signal;

the main board is disposed inside the casing, and the main board comprises a wireless signal receiver and a second conducting portion, wherein the wireless signal receiver is configured to wirelessly receive the first operation signal from the wireless signal emitter in the casing and to wirelessly receive a second operation signal from outside the casing, and a main circuit on the main board is configured to execute a first action corresponding to the first operation signal and to execute a second action corresponding to the second operation signal; and the conducting element is electrically connected to the first conducting portion and the second conducting portion.

2. The projection device according to claim 1, wherein the casing comprises a light-transmitting region, the light-transmitting region is correspondingly disposed on a receiving axis of the wireless signal receiver to receive the second operation signal from outside the casing, so that the second operation signal penetrates the light-transmitting region and then enters the casing, and is received by the wireless signal receiver of the main board.

3. The projection device according to claim 2, further comprising a lens disposed on the casing, wherein at least a part of the lens is disposed on the light-transmitting region.

4. The projection device according to claim 3, further comprising at least one signal reflection surface to reflect the first operation signal emitted by the wireless signal emitter to be received by the wireless signal receiver, wherein the at least one signal reflection surface comprises at least one of an inner surface of the casing, an upper surface of the main board, a lower surface of the main board, an upper surface of the operation circuit board, a lower surface of the operation circuit board, and an inner surface of the lens.

5. The projection device according to claim 2, further comprising a remote control device, wherein the remote control device is configured to emit the second operation signal from outside the casing.

6. The projection device according to claim 1, further comprising at least one signal reflection surface to reflect the first operation signal emitted by the wireless signal emitter, wherein the first operation signal is received by the wireless signal receiver, and the at least one signal reflection surface comprises at least one of an inner surface of the casing, an upper surface of the main board, a lower surface of the main board, an upper surface of the operation circuit board, and a lower surface of the operation circuit board.

7. The projection device according to claim 1, wherein the conducting element is an elastic metal element.

8. The projection device according to claim 1, wherein the operation circuit board comprises an upper surface and a lower surface, and the wireless signal emitter of the operation circuit board is disposed on one of the upper surface or the lower surface.

9. The projection device according to claim 1, wherein the operation circuit board comprises a lateral surface, and the wireless signal emitter of the operation circuit board is disposed on the lateral surface.

10. The projection device according to claim 9, wherein the wireless signal receiver of the main board is disposed on an extension plane of the operation circuit board.

11. The projection device according to claim 1, wherein the first operation signal is one of an infrared (IR) signal, a visible light signal, or a Bluetooth signal.

12. The projection device according to claim 1, wherein the wireless signal emitter comprises an emission axis, the wireless signal receiver comprises a receiving axis, and the emission axis is not parallel to the receiving axis.

13. The projection device according to claim 1, wherein the wireless signal emitter comprises an emission axis, the wireless signal receiver comprises a receiving axis, and the emission axis is perpendicular to the receiving axis.

14. The projection device according to claim 1, wherein a configuration surface of the wireless signal emitter is disposed opposite to a configuration surface of the wireless signal receiver.

15. The projection device according to claim 1, wherein the wireless signal receiver comprises a receiving axis, and the receiving axis is perpendicular to a planar extending direction of the main board.

16. The projection device according to claim 1, wherein the second conducting portion of the main board is configured to supply power to the first conducting portion of the operation circuit board.

* * * * *